US009161024B2

(12) United States Patent
Sawada (10) Patent No.: US 9,161,024 B2
(45) Date of Patent: Oct. 13, 2015

(54) DISPLAY DEVICE, DISPLAY CONTROL METHOD, AND PROGRAM (75) Inventor: Masaki Sawada, Kawasaki (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/125,525

(22) PCT Filed: Jul. 3, 2012

(86) PCT No.: PCT/JP2012/066962
§ 371 (c)(1),
(2), (4) Date: Dec. 11, 2013

(87) PCT Pub. No.: WO2013/005736
PCT Pub. Date: Jan. 10, 2013

(65) Prior Publication Data
US 2014/0135072 A1 May 15, 2014

(30) Foreign Application Priority Data

Jul. 7, 2011 (JP) ................................. 2011-150801

(51) Int. Cl.
H04N 13/04 (2006.01)
H04M 1/725 (2006.01)
(Continued)

(52) U.S. Cl.
CPC ........... *H04N 13/0454* (2013.01); *G09G 3/003* (2013.01); *H04M 1/0266* (2013.01); *H04M 1/72519* (2013.01); *G09G 2340/0435* (2013.01); *G09G 2340/0442* (2013.01); *G09G 2380/00* (2013.01)

(58) Field of Classification Search
CPC .......................... H04N 13/0454; H04M 1/0266

USPC ...................... 455/566, 158.4, 145, 550.1, 95
See application file for complete search history.

(56) References Cited

U.S. PATENT DOCUMENTS

2002/0164962 A1* 11/2002 Mankins et al. ................ 455/99
2009/0163195 A1* 6/2009 Kim et al. .................. 455/422.1
(Continued)

FOREIGN PATENT DOCUMENTS

CN 101924954 12/2010
JP 10-257542 9/1998
(Continued)

OTHER PUBLICATIONS

International Search Report corresponding to PCT/JP2012/066962, dated Oct. 2, 2012 (4 pages).
(Continued)

*Primary Examiner* — Cong Tran
(74) *Attorney, Agent, or Firm* — Wilmer Cutler Pickering Hale and Dorr LLP (57) ABSTRACT A display device includes a telephone communication signal reception antenna that receives radio waves utilized in telephone communication; a reception intensity measurement unit that measures an intensity of the radio waves received by the communication signal reception antenna; a determination unit that determines, based on the intensity of the radio waves measured by the reception intensity measurement unit, a display mode that displays an image at a display unit by using a representation method which is predetermined associated with the intensity of the radio waves; and a display control unit that controls the display unit based on the display mode determined by the determination unit.

5 Claims, 7 Drawing Sheets (51) Int. Cl.
*H04M 1/02* (2006.01)
*G09G 3/00* (2006.01)

(56) References Cited

U.S. PATENT DOCUMENTS

2010/0323609 A1    12/2010   Aramaki
2012/0088497 A1*    4/2012   Knapik et al. ................ 455/423

FOREIGN PATENT DOCUMENTS

| JP | 2007-082087 | 3/2007 |
|----|-------------|--------|
| JP | 2008-209802 | 9/2008 |
| JP | 2008-294536 | 12/2008 |
| JP | 4587237 | 11/2010 |
| JP | 2011-004036 | 1/2011 |
| JP | 2011-004405 | 1/2011 |
| JP | 2011-004405 A | 1/2011 |
| JP | 2012-004944 | 1/2012 |

OTHER PUBLICATIONS

International Search Report corresponding to PCT/JP2012/066962, dated Sep. 21, 2012, 4 pages.

* cited by examiner

DISPLAY DEVICE, DISPLAY CONTROL METHOD, AND PROGRAM

TECHNICAL FIELD

This application is a national stage application of International Application No. PCT/JP2012/066962 entitled "Display Device, Display Control Method, and Program," filed on Jul. 3, 2012, which claims priority to Japanese Patent Application No. 2011-150801, filed on Jul. 7, 2011, the disclosures of each of which are hereby incorporated by reference in their entirety.

The present invention relates to a display device, a display control method, and a program.

BACKGROUND ART

A technique is known in which display data such as (static or video) image, text, or menu data is displayed on a planar display device in a three-dimensional manner (i.e., 3D display) so that a user can view the data stereoscopically.

In a known example, the 3D display is implemented utilizing disparity between a user's right and left eyes, where data for the right eye and data for the left eye, which slightly differ from each other, are prepared, and those two display data items are displayed simultaneously. In this display method, so that the data for the right eye is visible to the right eye but not visible to the left eye and the data for the left eye is visible to the left eye but not visible to the right eye, a liquid crystal panel that functions as an electronic disparity barrier that blocks specific optical paths is disposed at an appropriate position, so as to provide the display data stereoscopically. This method is generally called a "disparity barrier method".

A liquid crystal display that can perform such 3D display and ordinary 2D (two-dimensional) display is utilized for televisions or the like and has recently been built in a portable terminal device that can receive TV broadcasting such as one-segment broadcasting (see, for example, Patent-Document 1).

PRIOR ART DOCUMENT

Patent Document

Patent Document 1: Japanese Unexamined Patent Application, First Publication No. 2011-4405.

DISCLOSURE OF INVENTION

Problem to be Solved by the Invention

However, in comparison with the 2D display, the 3D display drives a greater number of circuits in most cases. For example, in the disparity barrier method, it is necessary to drive both of a liquid crystal panel utilized to display the display data and a liquid crystal panel utilized for the disparity barrier. By contrast, the 2D display needs only to drive a liquid crystal panel utilized to display the display data.

Therefore, if displaying a 3D image in an environment that has a low reception level for telephone communication, communication of a portable terminal device may be disconnected or not established due to noise generated when driving lots of circuits. This may degrade the communication quality.

In light of the above circumstances, an object of the present invention is to provide a display device, a display control method, and a program, which can reduce the degradation of communication quality when an image is displayed on a display unit of a display device that has a communication function.

Means for Solving the Problem

In order to achieve the above object, the present invention provides a display device comprising:
a telephone communication signal reception antenna that receives radio waves utilized in telephone communication;
a reception intensity measurement unit that measures an intensity of the radio waves received by the communication signal reception antenna;
a determination unit that determines, based on the intensity of the radio waves measured by the reception intensity measurement unit, a display mode that displays an image at a display unit by using a representation method which is predetermined associated with the intensity of the radio waves; and
a display control unit that controls the display unit based on the display mode determined by the determination unit.

In a typical example of the above display device, the display unit comprises:
a two-dimensional display part that displays a two-dimensional image; and
a three-dimensional display part that displays a three-dimensional image; and
the determination unit determines the display mode to be one of:
a display mode that displays a three-dimensional image by utilizing the three-dimensional display part if the intensity of the radio waves measured by the reception intensity measurement unit is greater than or equal to a predetermined display dimension determination threshold, and
a display mode that displays a two-dimensional image by utilizing the two-dimensional display part if the intensity is less than the display dimension determination threshold.

In a preferable example of the above display device, the determination unit determines the display mode to be one of:
a display mode that displays an image with higher one of two resolutions that have a gap between them if the intensity of the radio waves measured by the reception intensity measurement unit is greater than or equal to a predetermined resolution determination threshold, and
a display mode that displays an image with lower one of the two resolutions if the intensity is less than the resolution determination threshold.

In another preferable example of the above display device, the determination unit determines the display mode to be one of:
a display mode that displays an image with higher one of two frame rates that have a gap between them if the intensity of the radio waves measured by the reception intensity measurement unit is greater than or equal to a predetermined frame rate determination threshold, and
a display mode that displays an image with lower one of the two frame rates if the intensity is less than the frame rate determination threshold.

The present invention also provides a display control method comprising:
a step that receives radio waves utilized in telephone communication;
a step that measures an intensity of the received radio waves;
a step that determines, based on the intensity of the measured radio waves, a display mode that displays an image at a display unit by using a representation method which is predetermined associated with the intensity of the radio waves; and a step that controls the display unit based on the determined display mode.

The present invention also provides a program utilized to make a computer function as:

a device that receives radio waves utilized in telephone communication;

a device that measures an intensity of the received radio waves;

a device that determines, based on the intensity of the measured radio waves, a display mode that displays an image at a display unit by using a representation method which is predetermined associated with the intensity of the radio waves; and a device that controls the display unit based on the determined display mode.

Effect of the Invention

In accordance with the present invention, it is possible to reduce the degradation of the communication quality when an image is displayed on a display unit of a display device that has a communication function.

MODE FOR CARRYING OUT THE INVENTION

First Embodiment

Figure 1:
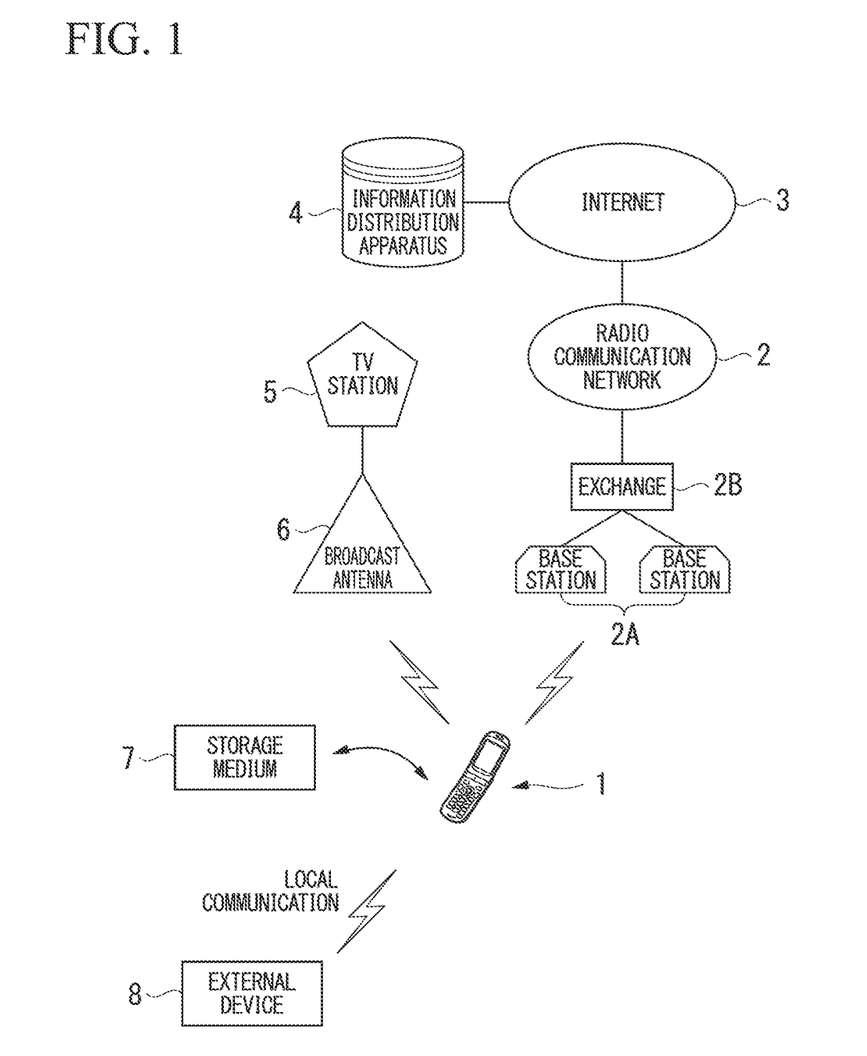
FIG. 1 is a diagram that shows an outline of an information collection system pertaining to a first embodiment of the present invention.

Below, an embodiment of the present invention will be explained with reference to the drawings. FIG. 1 is a diagram that shows an outline of an information collection system pertaining to the embodiment of the present invention.

In the present embodiment, a cellular phone terminal 1 functions as a display device.

FIG. 1 is a block diagram that shows a communication network system that can be used by this cellular phone terminal.

In addition to a telephone communication function, an e-mail function, and an Internet connecting function (i.e., Web accessing function), the cellular phone terminal 1 also has a TV function that receives a digital TV broadcasting (e.g., one-segment terrestrial digital TV broadcasting), a 3D (three-dimensional) display function, a video recording function, and the like.

In the 3D display function, display data (content data) such as video, static image, text, or menu data is displayed, not in a 2D (two-dimensional) manner, but as a 3D image by means of a disparity barrier method that utilizes disparity between the right and left eyes.

In the video recording function, content received from TV broadcasting or the like is recorded (which includes audio recording, and the same shall apply hereinafter). That is, this is a content recording function that is not limited to picture recording but also performs audio recording.

When the cellular phone terminal 1 is connected via a nearest base station 2A and exchange (or switch) 2B to a radio communication network 2 (i.e., a mobile communication network), the cellular phone terminal 1 can have a telephone communication with another cellular phone terminal 1 via the radio communication network 2.

In addition, when the cellular phone terminal 1 is connected via the radio communication network 2 to the Internet 3, the cellular phone terminal 1 can access and browse a Web site, and also can perform streaming that downloads and simultaneously plays multimedia content, which includes video, static images, audio, news, and the like, from an information distribution apparatus 4 via the Internet 3 and the radio communication network 2.

The cellular phone terminal 1 also receives terrestrial digital broadcasting (i.e., broadcast content) provided via a broadcast antenna 6 from a TV station 5. In addition, the cellular phone terminal 1 can also download and receive content of digital broadcasting (e.g., Internet radio) from the information distribution apparatus 4 via the radio communication network 2 and the Internet 3.

Accordingly, the cellular phone terminal 1 can receive broadcast content by means of the TV function, and can download and receive content for the streaming by means of the Internet connecting function.

The cellular phone terminal 1 can also obtain various kinds of content from a storage medium 7 (e.g., freely-detachable portable memory card) or from an external device 8 (e.g., another cellular phone) via local communication such as Bluetooth (registered trademark) communication or infrared communication.

Figure 2:
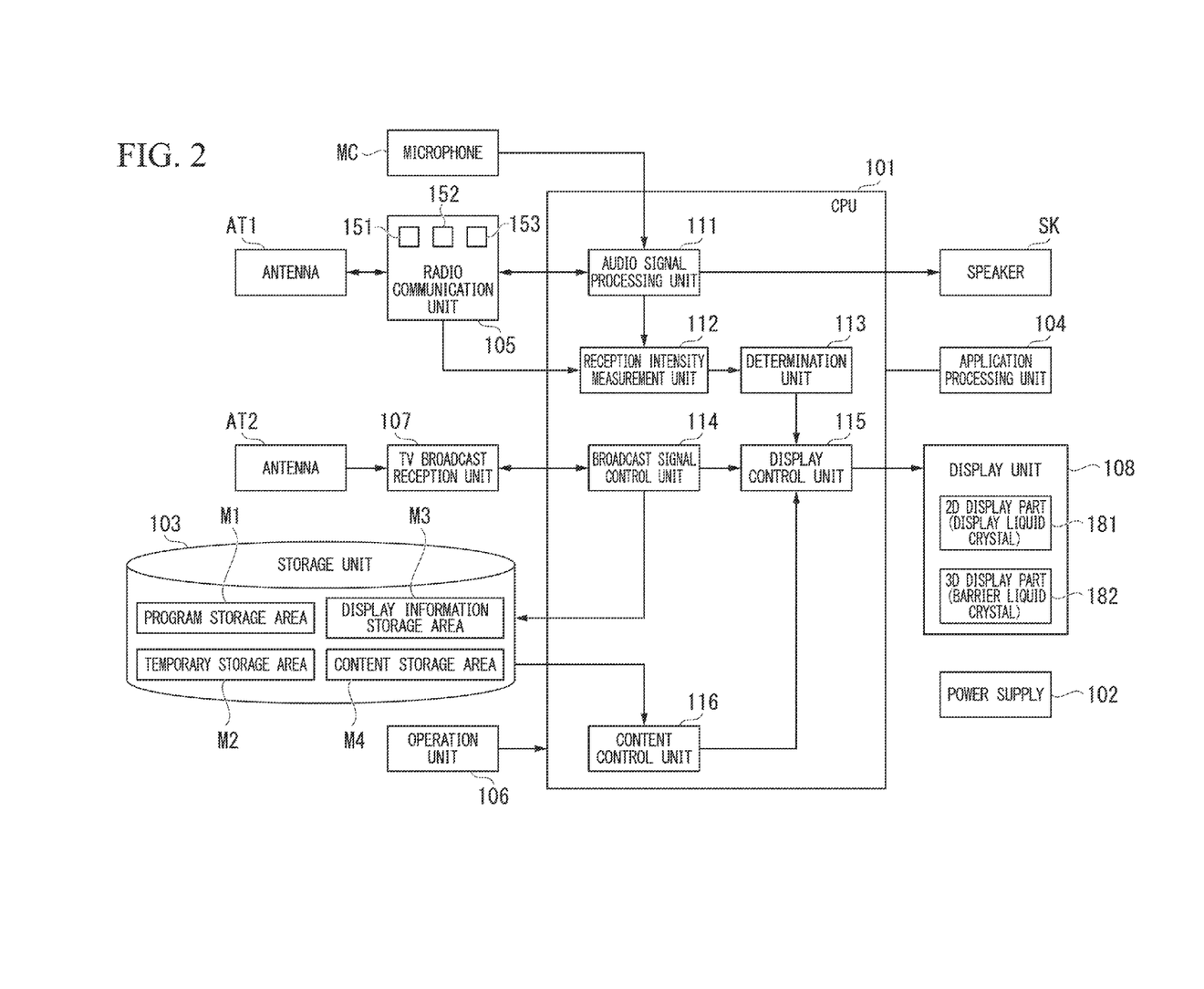
FIG. 2 is a block diagram that shows basic structural elements of a cellular phone terminal pertaining to the embodiment.

FIG. 2 is a block diagram that shows basic structural elements of the cellular phone terminal 1.

The cellular phone terminal 1 includes a CPU 101, a power supply 102, a storage unit 103, an application processing unit 104, a radio communication unit 105, an operation unit 106, a TV broadcast reception unit 107, a display unit 108, a microphone "MC", a speaker "SK", an antenna "AT1" that receives radio waves pertaining to communication, and an antenna "AT2" that receives radio waves pertaining to broadcasting.

The CPU 101 operates while receiving power from the power supply 102 that has a secondary cell. The CPU 101 includes a central processing unit that controls the general operation of the cellular phone terminal 1 based on various programs stored in the storage unit 103, and also includes memories and the like. Structural elements in the CPU 101 will be explained later.

The power supply 102 has a secondary cell, and supplies power of the secondary cell to each structural element of the cellular phone terminal 1 (in FIG. 2, arrows toward each structural element are omitted).

The storage unit 103 stores various information items utilized in operation of the cellular phone terminal 1, and may include a program storage area M1, a temporary storage area M2, a display information storage area M3, and a content storage area M4.

The storage unit 103 may include a freely-detachable portable memory (i.e., storage medium) such as an SD card or an IC card, and may be built in a specific external server (not shown).

The program storage area M1 is a storage area that stores programs for implementing the present embodiment in accordance with an operation flow shown in FIG. 4 (explained later), and various applications.

The temporary storage area M2 is a work area that temporarily stores various information items that are essential for the cellular phone terminal 1 to operate.

The display information storage area M3 is a storage area that stores information referred to in a determination performed by a determination unit 113. For example, the display information storage area M3 stores (i) a display dimension determination threshold Th10 that is predetermined as a threshold utilized to switch the dimension of an image to be displayed, and (ii) display modes associated with divided ranges for reception level, where the divided ranges are set by the display dimension determination threshold Th10.

The content storage area M4 is a storage area that stores content data received by the TV broadcast reception unit 107.

The application processing unit 104 stores information utilized in application processes pertaining to the e-mail function, the Internet connecting function, the TV function, and the like, and performs control for the processes.

The radio communication unit 105 includes a radio unit 151, a baseband unit 152, and a demultiplexing unit 153.

The radio unit 151 performs data communication with the transmission or reception with the nearest base station 2A via the antenna AT1 when, for example, the telephone communication function, the e-mail function, the Internet connecting function, or the like is active.

While the telephone communication function is active, the radio communication unit 105 acquires a signal (that was received by the radio unit 151) via a reception side of the baseband unit 152, and demodulates the acquired signal into a reception baseband signal. After that, the radio communication unit 105 outputs audio of this signal via the CPU 101 from the speaker SK utilized for telephone communication.

In addition, the radio communication unit 105 receives, via the CPU 101, audio data that was input using the microphone MC, and encodes the relevant data into a transmission baseband signal via the demultiplexing unit 153. After that, the radio communication unit 105 inputs the transmission baseband signal into a transmission side of the baseband unit 152, and then outputs this signal (input into the baseband unit 152) from the antenna AT1 via the radio unit 151.

The operation unit 106 receives operational input (or entry) such as dial input, character input, command input, or the like, and supplies an operation signal, that indicates the content of the operational input, to the CPU 101. The CPU 101 executes a process that corresponds to the operation signal received from the operation unit 106.

The TV broadcast reception unit 107 implements the TV function, and receives, not only one-segment terrestrial digital TV broadcasting suitable for cellular phone terminals, but also program information such as an electronic program listing (EPG information).

The TV broadcast reception unit 107 includes an analog circuit part that extracts a TV broadcast signal of a preselected channel from among TV broadcast signals received via the antenna AT2 (utilized for TV), and a digital circuit part that digital-demodulates the extracted broadcast signal.

The digital circuit part may (i) OFDM-demodulate a received TV broadcast signal (OFDM: Orthogonal Frequency Division Multiplexing), (ii) separate and decode video, audio, and (character) data from a multiplexed broadcast signal, or (iii) decompress compressed data.

The display unit 108 includes a 2D display part 181 (liquid crystal panel for display) utilized to display a 2D image, and a 3D display part 182 (liquid crystal panel for disparity barrier) utilized to display a 3D image. An example of the display unit 108 will be explained referring to FIG. 3.

Figure 3:
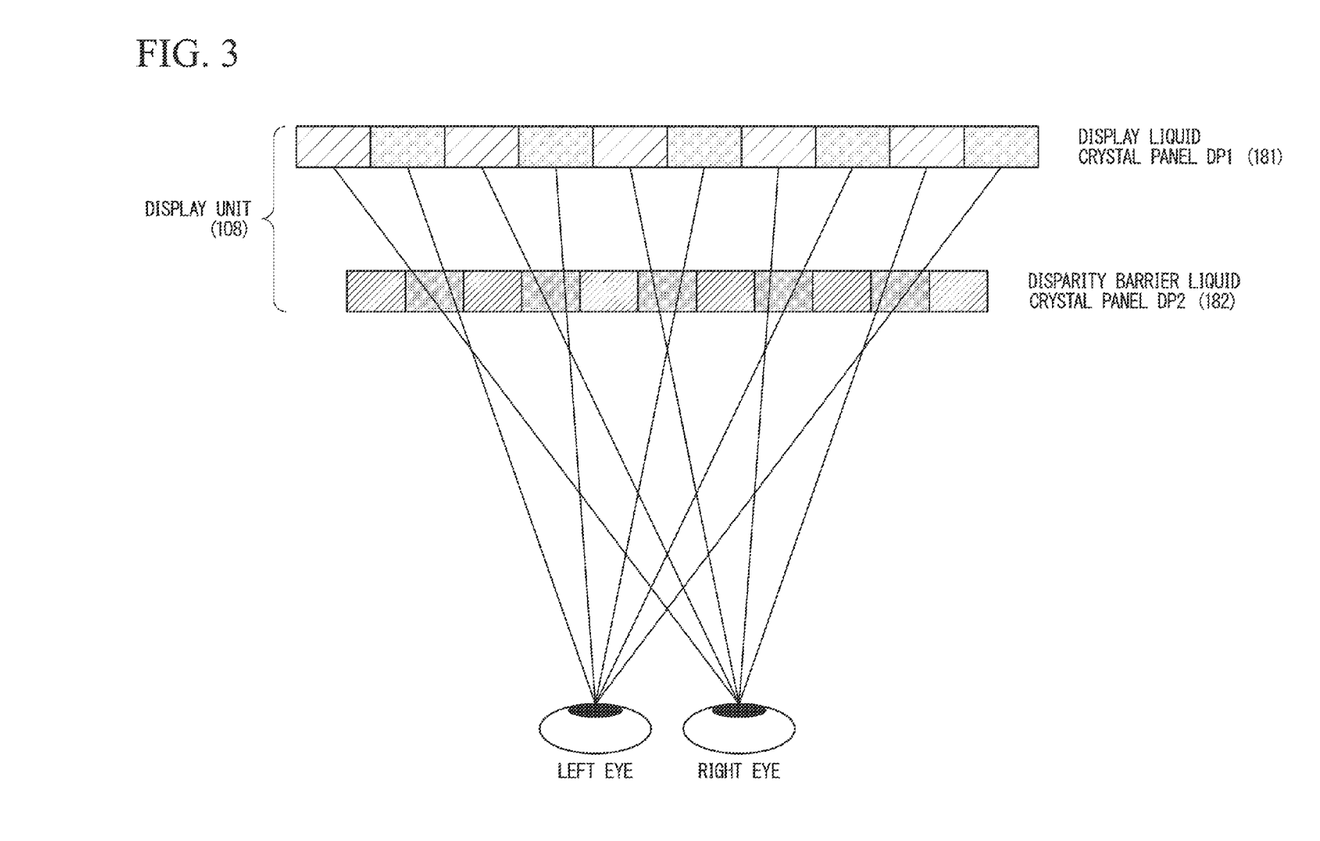
FIG. 3 is a diagram that shows an example of the structure of a display unit in the embodiment.

Here, the display unit 108 pertaining to the present embodiment utilizes the disparity barrier method by which a 3D image can be seen with the naked eyes.

As shown in FIG. 3, the display unit 108 has a display liquid crystal panel DP1 as the 2D display part 181 and a disparity barrier liquid crystal panel DP2 as the 3D display part 182.

The display unit 108 utilizes the display liquid crystal panel DP1 as the 2D display part 181 to display, for example, character information, an image for standby display, TV video, or a shot image, as a 2D image.

Additionally, the display unit 108 can display the display data as a 3D image by utilizing both of the display liquid crystal panel DP1 as the 2D display part 181 and the disparity barrier liquid crystal panel DP2 as the 3D display part 182.

The display liquid crystal panel DP1 and the disparity barrier liquid crystal panel DP2 are arranged in parallel to each other. In addition, the disparity barrier liquid crystal panel DP2 is disposed closer to a relevant display plane than the display liquid crystal panel DP1. Accordingly, light emitted from the display liquid crystal panel DP1 is provided through the disparity barrier liquid crystal panel DP2 toward the user.

When the disparity barrier liquid crystal panel DP2 transmits the entire light emitted from the display liquid crystal panel DP1, the display unit 108 displays a 2D image.

On the other hand, if the disparity barrier liquid crystal panel DP2 is operated so that the right and left eyes see different images (see FIG. 3), then the display unit 108 displays a 3D image.

More specifically, in order to display a 3D image, data for the right eye and data for the left eye, which are shifted from each other, are prepared, and those two display data items are displayed simultaneously on the display liquid crystal panel DP1. Additionally, in order that the data for the right eye is visible to the right eye but not visible to the left eye and the data for the left eye is visible to the left eye but not visible to the right eye, the disparity barrier liquid crystal panel DP2 blocks relevant optical paths. Therefore, displayed data can be shown stereoscopically.

Returning to FIG. 2, an example of the structure of the CPU 101 will be explained in detail.

The CPU 101 includes an audio signal processing unit 111, a reception intensity measurement unit 112, a determination unit 113, a broadcast signal control unit 114, a display control unit 115, and a content control unit 116.

When the audio signal processing unit 111 receives a reception baseband signal that has been demodulated by the radio communication unit 105. Based on the reception baseband signal, the audio signal processing unit 111 outputs audio of this signal from the speaker SK utilized for telephone communication. Additionally, when receiving audio data from the microphone MC (for telephone communication), the audio signal processing unit 111 encodes the relevant data into a transmission baseband signal, and then outputs this signal to the transmission side of the baseband unit in the radio communication unit 105.

The reception intensity measurement unit 112 measures the reception level of radio waves received by the radio unit 151 of the radio communication unit 105, and outputs a value (reception level value), that indicates the measured reception level, to the determination unit 113. The reception level measured by the reception intensity measurement unit 112 is indicated by RSCP (Received Signal Code Power), RSSI (Received Signal Strength Indicator), or the like.

Based on the reception level value measured by the reception intensity measurement unit 112, the determination unit 113 performs a determination between predetermined display modes associated with reception level values. The respective display modes display images in different representation manners.

The display modes may include a 2D display mode that displays a 2D image at the display unit 108, and a 3D display mode that displays a 3D image at the display unit 108.

The determination unit 113 compares the display dimension determination threshold Th10, that is predetermined as a threshold utilized to switch the dimension of an image to be displayed, with the reception level value measured by the reception intensity measurement unit 112. When the reception level value measured by the reception intensity measurement unit 112 is less than the display dimension determination threshold Th10, the determination unit 113 determines the mode to be the 2D display mode that displays a 2D image by means of the 2D display part 181. By contrast, if the reception level value supplied from the reception intensity measurement unit 112 is greater than or equal to the display dimension determination threshold Th10, the determination unit 113 determines the mode to be the 3D display mode that displays a 3D image by utilizing the 3D display part 182.

If it has been determined that received images are displayed in real time, the broadcast signal control unit 114 controls, based on a digital-modulated broadcast signal received from the TV broadcast reception unit 107, the display control unit 115 to display the display data at the display unit 108. On the other hand, if it has been determined that received images are stored in the storage unit 103 and then displayed, the broadcast signal control unit 114 stores the digital-modulated broadcast signal (received from the TV broadcast reception unit 107) into the display information storage area M3 in the storage unit 103.

Based on the display mode determined by the determination unit 113, the display control unit 115 controls the display unit 108.

If the mode is determined by the determination unit 113 to be the 2D display mode, the display control unit 115 controls the display unit 108 to display the display data, that is received from the broadcast signal control unit 114 or the content control unit 116, as a 2D image. That is, the display control unit 115 drives the 2D display part 181 of the display unit 108 to display a 2D image at the display unit 108.

On the other hand, if the mode is determined by the determination unit 113 to be the 3D display mode, the display control unit 115 controls the display unit 108 to display the display data, that is received from the broadcast signal control unit 114 or the content control unit 116, as a 3D image. That is, the display control unit 115 drives the 2D display part 181 and the 3D display part 182 of the display unit 108 to display a 3D image at the display unit 108.

When the content control unit 116 is instructed via the operation unit 106 to display the display data, which (content data) has been stored in the storage unit 103, at the display unit 108, the content control unit 116 retrieves designated display data from the display information storage area M3 of the storage unit 103, and controls the display control unit 115 to display an image based on the retrieved display data at the display unit 108.

Next, referring to FIGS. 4 and 5, an example of the display control method of the cellular phone terminal 1 pertaining to the present embodiment will be explained. FIG. 4 is a flowchart utilized to explain the example of the display control method of the cellular phone terminal 1. FIG. 5 is a diagram referred to when explaining the relevant example of the display control method.

Step ST1

Figure 4:
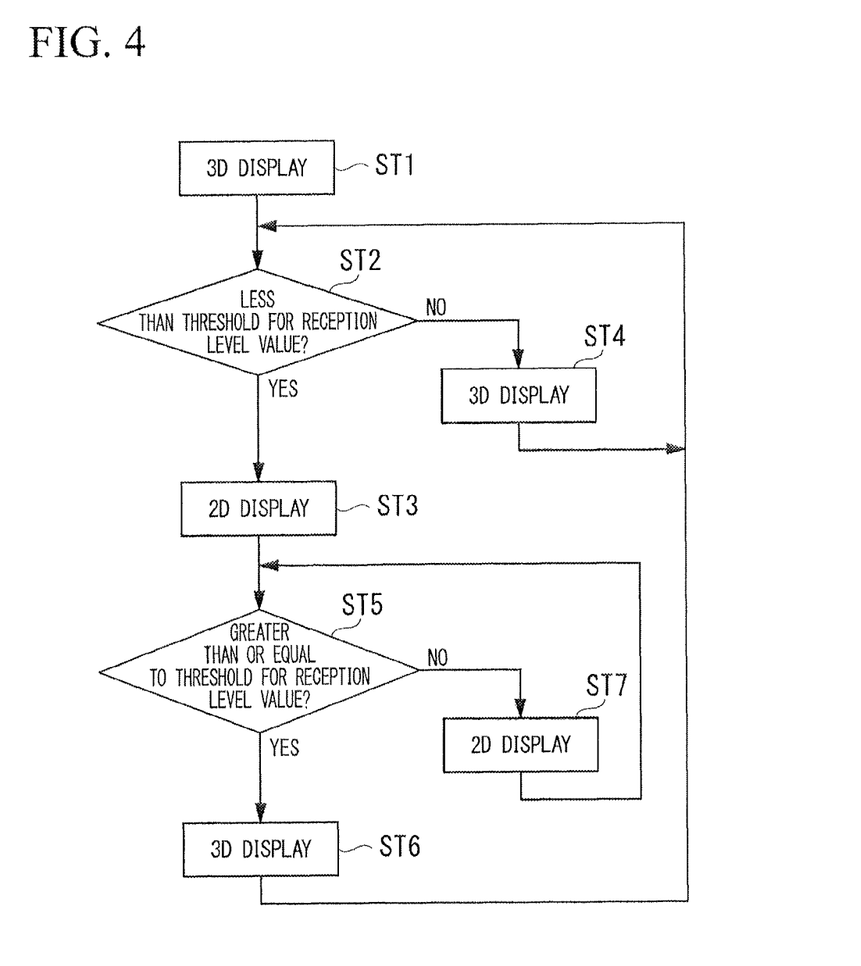
FIG. 4 is a flowchart utilized to explain an example of the display control method of the cellular phone terminal in the embodiment.
Figure 5:
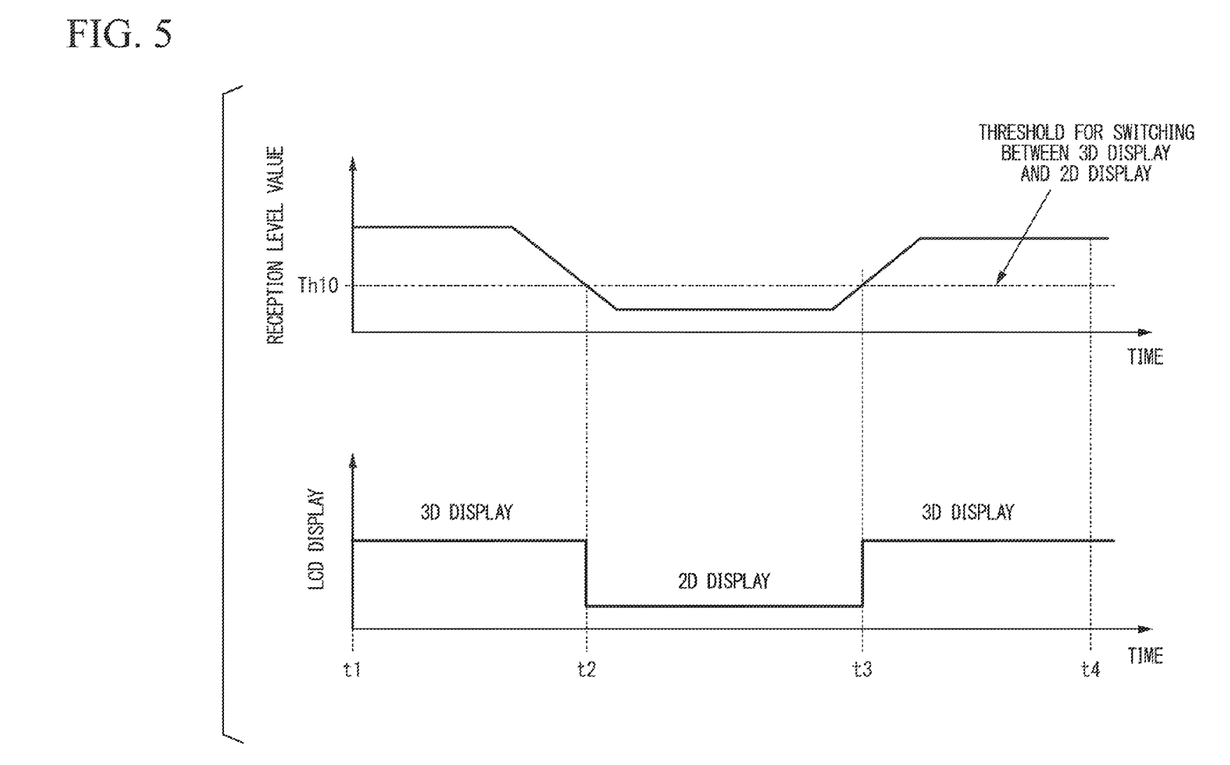
FIG. 5 is a diagram referred to when explaining the example of the display control method of the cellular phone terminal in the embodiment.

As shown in FIGS. 4 and 5, when the reception level value supplied from the reception intensity measurement unit 112 is greater than or equal to the display dimension determination threshold Th10 (see time t1 to time t2), the display control unit 115 controls the display unit 108 to display the display data, that is received from the broadcast signal control unit 114 or the content control unit 116, as a 3D image. Therefore, the display control unit 115 drives the 2D display part 181 and the 3D display part 182 of the display unit 108 to display a 3D image at the display unit 108.

Step ST2

The determination unit 113 compares the reception level value output from the reception intensity measurement unit 112 with the predetermined display dimension determination threshold Th10.

Step ST3

Here, the reception level value is changed from "greater than or equal to the display dimension determination threshold Th10" to "less than the display dimension determination threshold Th10" (see time t2).

When the reception level value supplied from the reception intensity measurement unit 112 is less than the display dimension determination threshold Th10, the determination unit 113 determines the mode to be the 2D display mode that displays a 2D image by means of the 2D display part 181. Then the display control unit 115 controls the display unit 108 to display the display data, that is received from the broadcast signal control unit 114 or the content control unit 116, as a 2D image. Therefore, the display control unit 115 drives the 2D display part 181 of the display unit 108 to display a 2D image at the display unit 108 (see time t2 to time t3).

Step ST4

On the other hand, if the reception level value supplied from the reception intensity measurement unit 112 is greater than or equal to the display dimension determination threshold Th10 (in the above step ST2), the determination unit 113 determines the mode to be the 3D display mode that displays a 3D image by utilizing the 3D display part 182. The display control unit 115 thus controls the display unit 108 to display the display data, that is received from the broadcast signal control unit 114 or the content control unit 116, as a 3D image. Therefore, the display control unit 115 drives the 2D display part 181 and the 3D display part 182 of the display unit 108 to display a 3D image at the display unit 108.

Step ST5

Next, the determination unit 113 compares the reception level value output from the reception intensity measurement unit 112 with the predetermined display dimension determination threshold Th10.

Step ST6

Here, the reception level value is changed from "less than the display dimension determination threshold Th10" to "greater than or equal to the display dimension determination threshold Th10" (see time t3).

When the reception level value supplied from the reception intensity measurement unit 112 is greater than or equal to the display dimension determination threshold Th10, the determination unit 113 determines the mode to be the 3D display mode that displays a 3D image by utilizing the 3D display part 182. The display control unit 115 thus controls the display unit 108 to display the display data, that is received from the broadcast signal control unit 114 or the content control unit 116, as a 3D image. Therefore, the display control unit 115 drives the 2D display part 181 and the 3D display part 182 of the display unit 108 to display a 3D image at the display unit 108 (see time t3 to time t4). The operation then returns to step ST2.

Step ST7

On the other hand, if the reception level value supplied from the reception intensity measurement unit 112 is less than the display dimension determination threshold Th10 (in the above step ST5), the determination unit 113 determines the mode to be the 2D display mode that displays a 2D image by means of the 2D display part 181. Then the display control unit 115 controls the display unit 108 to display the display data, that is received from the broadcast signal control unit 114 or the content control unit 116, as a 2D image. Therefore, the display control unit 115 drives the 2D display part 181 of the display unit 108 to display a 2D image at the display unit 108.

As described above, in the display control method of the cellular phone terminal 1 pertaining to the present embodiment, (i) when the reception level value of the radio waves for telephone communication has been changed to a state of being greater than or equal to the display dimension determination threshold Th10, the display mode is switched to the 3D display, and (i) when the reception level value of the radio waves for telephone communication has been changed to a state of being less than the display dimension determination threshold Th10, the display mode is switched to the 2D display. Accordingly, when the reception level value is low, it is possible to drive the 2D display part 181 without driving the 3D display part 182, so that an 2D image is displayed at the display unit 108.

Therefore, when the reception level value is low, it is possible to reduce the number of circuits to be driven, and thereby noise generated by driving the circuits can be reduced, and degradation in the reception level value of radio waves for telephone communication can be prevented.

In other words, when the reception level value is low, the cellular phone terminal 1 can reduce noise pertaining to radio waves utilized for telephone communication, and thereby reception level suitable for telephone communication can be secured. Accordingly, even while a 3D image is displayed at the display unit 108, if the reception level value for telephone communication is low, it is possible to switch to 2D image display, and thus to prevent a further decrease in the low reception level due to noise generated by driving circuits utilized to display images.

The cellular phone terminal 1 pertaining to the present embodiment is not limited to the above-described form, and may determine switching between the following display modes.

An example includes a low resolution display mode that displays an image at the display unit 108 with a low-level resolution and a high resolution display mode that displays an image at the display unit 108 with a high-level resolution, where the resolution of the "low-level resolution" is lower than the resolution of the "high-level resolution".

In this case, the determination unit 113 compares a resolution determination threshold Th20, that is predetermined as a threshold utilized to switch the resolution of an image to be displayed, with the reception level value measured by the reception intensity measurement unit 112.

If the reception level value measured by the reception intensity measurement unit 112 is less than the resolution determination threshold Th20, the determination unit 113 determines the mode to be a low resolution display mode that displays an image at the display part 181 with a resolution of a predetermined low level. By contrast, if the reception level value measured by the reception intensity measurement unit 112 is greater than or equal to the resolution determination threshold Th20, the determination unit 113 determines the mode to be a high resolution display mode that displays an image at the display part 181 with a resolution of a predetermined high level.

When the reception level value of the radio waves for telephone communication has been changed to a state of being greater than or equal to the resolution determination threshold Th20, the resolution for images is switched to that having the high level. When the reception level value of the radio waves for telephone communication has been changed to a state of being less than the resolution determination threshold Th20, the resolution for images is switched to that having the low level.

Therefore, when the reception level value is low, it is possible to reduce the amount of display data to be displayed at the display unit 108, and thereby operation load of the CPU 101 so as to drive the display unit 108 can be reduced. Accordingly, it is possible to prevent a further decrease in the low reception level due to noise generated by an increased operational load of the CPU 101.

The cellular phone terminal 1 pertaining to the present embodiment is not limited to the above-described form, and may determine switching between the following display modes.

An example includes a low frame rate display mode that displays an image at the display unit 108 with a low-level frame rate and a high frame rate display mode that displays an image at the display unit 108 with a high-level frame rate, where the frame rate of the "low-level frame rate" is lower than the frame rate of the "high-level frame rate".

In this case, the determination unit 113 compares a frame rate determination threshold Th30, that is predetermined as a threshold utilized to switch the frame rate of an image to be displayed, with the reception level value measured by the reception intensity measurement unit 112.

If the reception level value measured by the reception intensity measurement unit 112 is less than the frame rate determination threshold Th30, the determination unit 113 determines the mode to be a low frame rate display mode that displays an image at the display part 181 with a frame rate of a predetermined low level. By contrast, if the reception level value measured by the reception intensity measurement unit 112 is greater than or equal to the frame rate determination threshold Th30, the determination unit 113 determines the mode to be a high frame rate display mode that displays an image at the display part 181 with a frame rate of a predetermined high level.

When the reception level value of the radio waves for telephone communication has been changed to a state of being greater than or equal to the frame rate determination threshold Th30, the frame rate for images is switched to that having the high level. When the reception level value of the radio waves for telephone communication has been changed to a state of being less than the frame rate determination threshold Th30, the frame rate for images is switched to that having the low level.

Therefore, when the reception level value is low, it is possible to reduce the clock frequency of display data to be displayed at the display unit 108, and thereby generation of noise due to harmonics can be reduced. Accordingly, it is possible to prevent a further decrease in the low reception level due to such noise.

Second Embodiment

Below, a second embodiment of the present invention will be explained with reference to FIGS. 6 and 7.

Since a cellular phone terminal 1 pertaining to the present embodiment has a structure similar to the above-described cellular phone terminal 1, identical reference numerals are given, and detailed explanations thereof are omitted here.

Figure 6:
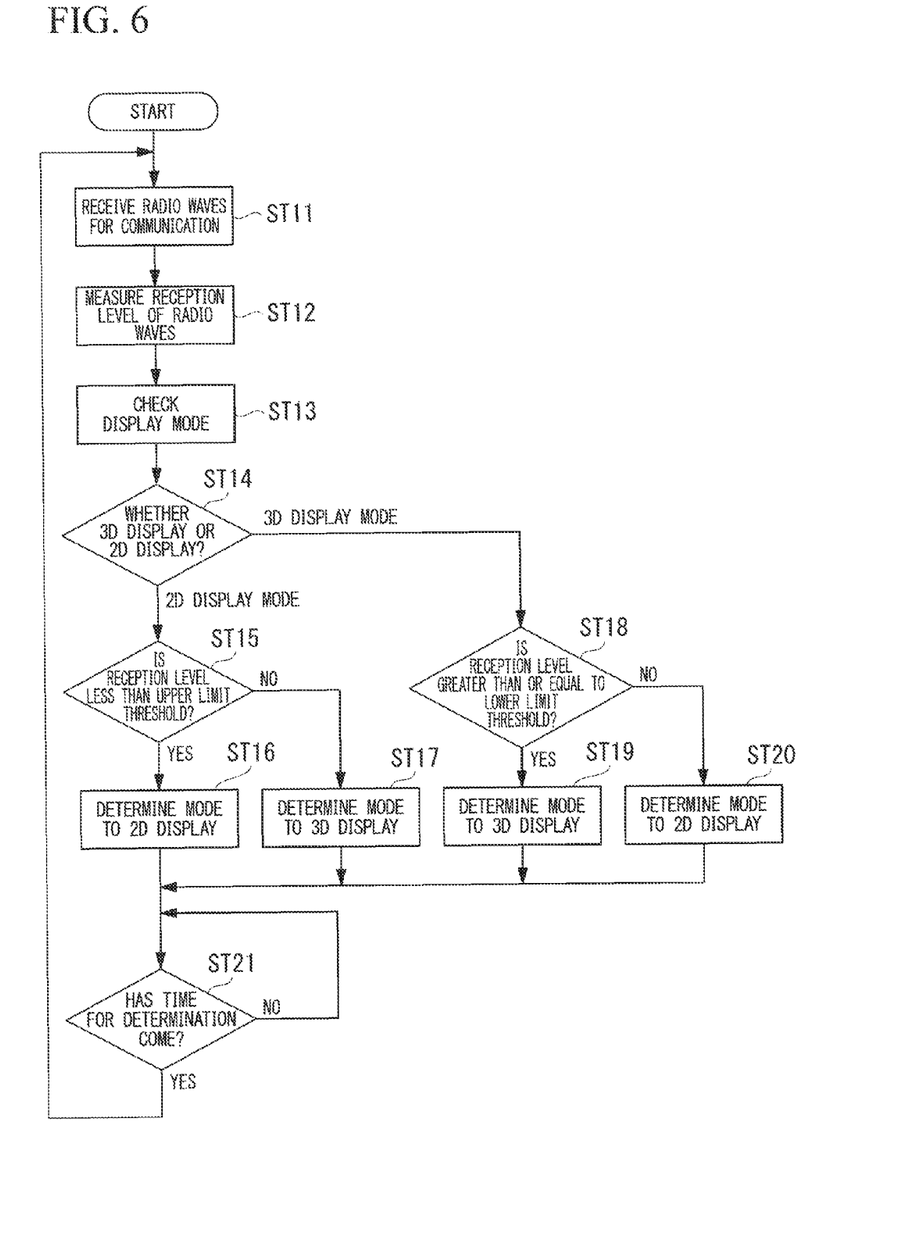
FIG. 6 is a flowchart utilized to explain an example of the display control method of a cellular phone terminal pertaining to a second embodiment of the present invention.

FIG. 6 is a flowchart utilized to explain an example of the display control method of the cellular phone terminal 1 pertaining to the present embodiment. FIG. 7 is a diagram referred to when explaining the relevant example of the display control method.

The determination unit 113 of the cellular phone terminal 1 pertaining to the present embodiment employs a lower limit display dimension determination threshold Th11, that is predetermined as a threshold utilized to switch the dimension of an image to be displayed from 3D to 2D, and an upper limit display dimension determination threshold Th12, that is predetermined as a threshold utilized to switch the dimension of an image to be displayed from 2D to 3D, so as to perform a determination between predetermined display modes associated with reception level values.

The lower limit display dimension determination threshold Th11 is lower than the upper limit display dimension determination threshold Th12, and there is a predetermined gap between these thresholds.

While a 3D image is displayed, the determination unit 113 compares the lower limit display dimension determination threshold Th11 with the reception level value measured by the reception intensity measurement unit 112.

When the reception level value measured by the reception intensity measurement unit 112 is less than the lower limit display dimension determination threshold Th11, the determination unit 113 determines the mode to be the 2D display mode that displays a 2D image by means of the 2D display part 181. That is, while a 3D image is displayed, if the reception level value becomes less than the lower limit display dimension determination threshold Th11, the mode is switched from the 3D display mode to the 2D display mode.

On the other hand, while a 2D image is displayed, the determination unit 113 compares the upper limit display dimension determination threshold Th12 with the reception level value measured by the reception intensity measurement unit 112. When the reception level value measured by the reception intensity measurement unit 112 is greater than or equal to the upper limit display dimension determination threshold Th12, the determination unit 113 determines the mode to be the 3D display mode that displays a 3D image by utilizing the 3D display part 182. That is, while a 2D image is displayed, if the reception level value becomes greater than or equal to the upper limit display dimension determination threshold Th12, the mode is switched from the 2D display mode to the 3D display mode.

The determination unit 113 has a memory area, and stores information, that indicates the determined display mode, into this memory area.

Figure 7:
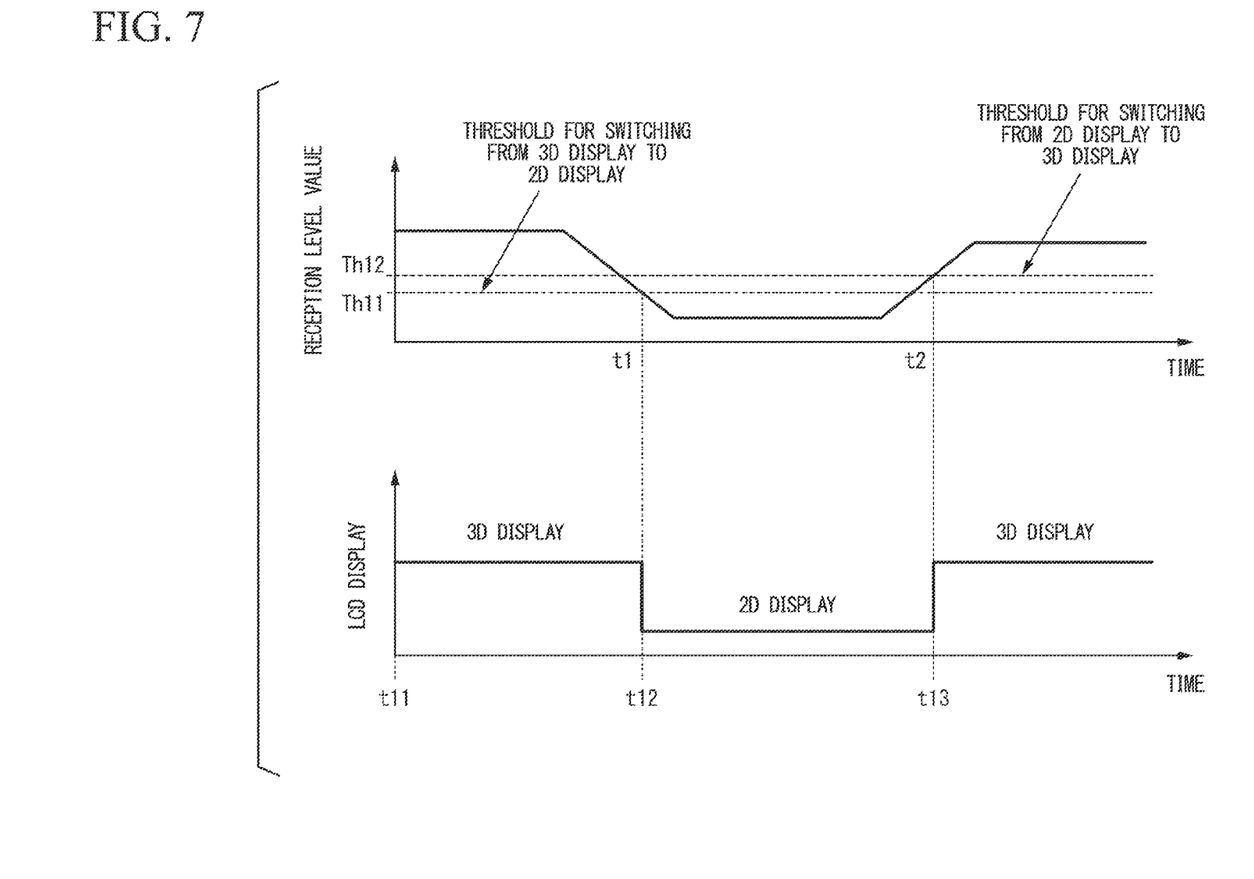
FIG. 7 is a diagram referred to when explaining the example of the display control method of the cellular phone terminal in the second embodiment.

The following explanation corresponds to a flowchart of FIG. 7.

Step ST11
The radio communication unit 105 of the cellular phone terminal 1 receives radio waves for telephone communication via the antenna AT1.

Step ST12
The reception intensity measurement unit 112 of the CPU 101 measures the reception level of radio waves received by the radio communication unit 105, and outputs the reception level value to the determination unit 113.

Step ST13
Next, the determination unit 113 checks the current display mode stored in its memory area.

Step ST14
The determination unit 113 then determines whether or not the current display mode is the 2D display mode or the 3D display mode.

Step ST15
If it is determined in the step ST14 that the current display mode is the 2D display mode, the determination unit 113 determines whether or not the reception level value measured by the reception intensity measurement unit 112 is less than the upper limit display dimension determination threshold Th12.

Step ST16
If it is determined that the reception level value measured by the reception intensity measurement unit 112 is less than the upper limit display dimension determination threshold Th12, the determination unit 113 determines the mode to be the 2D display mode that displays a 2D image by means of the 2D display part 181. That is, the display control unit 115 continues to control the display unit 108 to display the display data, that is received from the broadcast signal control unit 114 or the content control unit 116, as a 2D image. The display control unit 115 displays a 2D image at the display unit 108 by driving the 2D display part 181 of the display unit 108.

Step ST17
By contrast, if it is determined that the reception level value measured by the reception intensity measurement unit 112 is greater than or equal to the upper limit display dimension determination threshold Th12 (see t13 in FIG. 7), the determination unit 113 determines the mode to be the 3D display mode that displays a 3D image by utilizing the 3D display part 182.

The display control unit 115 thus controls the display unit 108 to display the display data, that is received from the broadcast signal control unit 114 or the content control unit 116, as a 3D image. Therefore, the display control unit 115 drives the 2D display part 181 and the 3D display part 182 of the display unit 108 to display a 3D image at the display unit 108.

The determination unit 113 then stores the 3D display mode as the current display mode that is stored in its memory area.

Step ST18
On the other hand, if it is determined in step ST14 that the current display mode is the 3D display mode, the determination unit 113 determines whether or not the reception level value measured by the reception intensity measurement unit 112 is greater than or equal to the lower limit display dimension determination threshold Th11.

Step ST19
If it is determined that the reception level value measured by the reception intensity measurement unit 112 is greater than or equal to the lower limit display dimension determination threshold Th11, the determination unit 113 determines the mode to be the 3D display mode that displays a 3D image by utilizing the 3D display part 182.

That is, the display control unit 115 continues to control the display unit 108 to display the display data, that is received from the broadcast signal control unit 114 or the content control unit 116, as a 3D image. The display control unit 115 displays a 3D image at the display unit 108 by driving the 2D display part 181 and the 3D display part 182 of the display unit 108.

Step ST20

By contrast, if it is determined that the reception level value measured by the reception intensity measurement unit 112 is less than the lower limit display dimension determination threshold Th11, the determination unit 113 determines the mode to be the 2D display mode that displays a 2D image by utilizing the 2D display part 181. The display control unit 115 thus controls the display unit 108 to display the display data, that is received from the broadcast signal control unit 114 or the content control unit 116, as a 2D image. Therefore, the display control unit 115 drives the 2D display part 181 of the display unit 108 to display a 2D image at the display unit 108 (see time t12 to t13).

The determination unit 113 then stores the 2D display mode as the current display mode that is stored in its memory area.

Step ST21

The determination unit 113 then determines whether or not a predetermined time for determination has come. For example, when a specific time has elapsed from the time of the previous determination, the determination unit 113 determines that the time for determination has come. If it is determined that the time for determination has come, the operation returns to step ST11 to repeat the above-described operation.

As described above, the lower limit display dimension determination threshold Th11 and the upper limit display dimension determination threshold Th12 are employed to provide a gap between these thresholds. Therefore, when the reception level value is in the vicinity of the lower limit display dimension determination threshold Th11 or the upper limit display dimension determination threshold Th12, it is possible to prevent the display mode from being switched frequently.

The cellular phone terminal 1 pertaining to the present embodiment is not limited to the above-described form, and may determine switching between the following display modes.

For example, the determination unit 113 employs a lower limit resolution determination threshold Th21, that is predetermined as a threshold utilized to switch the resolution of an image to be displayed from a high-level resolution to a low-level resolution, and an upper limit resolution determination threshold Th22, that is predetermined as a threshold utilized to switch the resolution of an image to be displayed from a low-level resolution to a high-level resolution, so as to perform a determination between predetermined display modes associated with reception level values. Here, the lower limit resolution determination threshold Th21 is lower than the upper limit resolution determination threshold Th22, and there is a predetermined gap between these thresholds. It is preferable to interpose the lower limit resolution determination threshold Th21 and the upper limit resolution determination threshold Th22 between the lower limit display dimension determination threshold Th11 and the upper limit display dimension determination threshold Th12.

While a high-resolution image is displayed in accordance with a high resolution display mode, the determination unit 113 compares the lower limit resolution determination threshold Th21 with the reception level value measured by the reception intensity measurement unit 112. When the reception level value measured by the reception intensity measurement unit 112 is less than the lower limit resolution determination threshold Th21, the determination unit 113 determines the mode to be a low resolution display mode. That is, while a high-resolution image is displayed in accordance with the high resolution display mode, if the reception level value becomes less than the lower limit resolution determination threshold Th21, the resolution of the displayed image is switched to a low level.

By contrast, while a low-resolution image is displayed in accordance with the low resolution display mode, the determination unit 113 compares the upper limit resolution determination threshold Th22 with the reception level value measured by the reception intensity measurement unit 112. When the reception level value measured by the reception intensity measurement unit 112 is greater than or equal to the upper limit resolution determination threshold Th22, the determination unit 113 determines the mode to be the high resolution display mode. That is, while a low-resolution image is displayed in accordance with the low resolution display mode, if the reception level value becomes greater than or equal to the upper limit resolution determination threshold Th22, the resolution of the displayed image is switched to a high level.

The determination unit 113 has a memory area, and stores information, that indicates the determined display mode, into this memory area.

The determination unit 113 performs the display mode determination by a method similar to that which was explained referring to FIG. 6.

Accordingly, when displaying a 3D image in an environment in which the reception level is decreasing, the level of resolution can be reduced without switching the mode to the 2D display so as to prevent the reception level from decreasing due to noise.

Similarly, the determination unit 113 employs a lower limit frame rate determination threshold Th31, that is predetermined as a threshold utilized to switch the frame rate of an image to be displayed from a high-level frame rate to a low-level frame rate, and an upper limit frame rate determination threshold Th32, that is predetermined as a threshold utilized to switch the frame rate of an image to be displayed from a low-level frame rate to a high-level frame rate, so as to perform a determination between predetermined display modes associated with reception level values. It is preferable to interpose the lower limit frame rate determination threshold Th31 and the upper limit frame rate determination threshold Th32 between the lower limit display dimension determination threshold Th11 and the upper limit display dimension determination threshold Th12.

The cellular phone terminal 1 pertaining to the present embodiment includes a computer system. The steps in the relevant operation are stored as a program in a computer-readable storage medium, and the operation is performed when the relevant computer loads and executes the program. The above computer system includes hardware resources such as a CPU, various types of memories, an OS, and peripheral devices.

If the computer system employs a WWW system, the computer system can provide a homepage service (or viewable) environment.

The above computer readable storage medium is a storage device, for example, a portable medium such as a flexible disk, a magneto optical disk, a ROM, a writable and nonvolatile memory (e.g., flash memory), or a CD-ROM, or a memory device such as a hard disk built in a computer system.

The computer readable storage medium also includes a device for temporarily storing the program, such as a volatile storage medium (e.g., DRAM (dynamic random access memory)) in a computer system which functions as a server or client and receives the program via a network (e.g., the Internet) or a communication line (e.g., a telephone line).

The above program, stored in a memory device of a computer system, may be transmitted via a transmission medium or by using transmitted waves passing through a transmission medium to another computer system. The transmission medium for transmitting the program has a function of transmitting data, and is, for example, a (communication) network such as the Internet or a communication line (e.g., a telephone line).

In addition, the program may execute a part of the above-explained functions.

The program may also be a "differential" program so that the above-described functions can be executed by a combination program of the differential program and an existing program which has already been stored in the relevant computer system.

INDUSTRIAL APPLICABILITY

In accordance with the present invention, it is possible to reduce the degradation of the communication quality when an image is displayed on a display unit of a display device that has a communication function.

REFERENCE SYMBOLS 1 cellular phone terminal
101 CPU
102 power supply
103 storage unit
104 application processing unit
105 radio communication unit
106 operation unit
107 TV broadcast reception unit
108 display unit
MC microphone
SK speaker
AT1 antenna that receives radio waves for communication
AT2 antenna that receives radio waves for broadcasting
111 audio signal processing unit
112 reception intensity measurement unit
113 determination unit
114 broadcast signal control unit
115 display control unit
116 content control unit

The invention claimed is:

1. A display device comprising:
a telephone communication signal reception antenna that receives radio waves utilized in telephone communication;
a reception intensity measurement unit that measures an intensity of the radio waves received by the communication signal reception antenna;
a determination unit that determines, based on the intensity of the radio waves measured by the reception intensity measurement unit, a display mode that displays an image at a display unit by using a representation method which is predetermined associated with the intensity of the radio waves; and
a display control unit that controls the display unit based on the display mode determined by the determination unit, wherein the display unit comprises:
a two-dimensional display part that displays a two-dimensional image; and
a three-dimensional display part that displays a three-dimensional image; and
wherein the determination unit determines the display mode to be one of:
a display mode that displays a three-dimensional image by utilizing the three-dimensional display part if the intensity of the radio waves measured by the reception intensity measurement unit is greater than or equal to a predetermined display dimension determination threshold, and
a display mode that displays a two-dimensional image by utilizing the two-dimensional display part if the intensity is less than the display dimension determination threshold.

2. A display device comprising:
a telephone communication signal reception antenna that receives radio waves utilized in telephone communication;
a reception intensity measurement unit that measures an intensity of the radio waves received by the communication signal reception antenna;
a display control unit that controls the display unit based on the display mode determined by the determination unit; and
a determination unit that determines, based on the intensity of the radio waves measured by the reception intensity measurement unit, a display mode that displays an image at a display unit by using a representation method which is predetermined associated with the intensity of the radio waves, wherein the determination unit determines the display mode to be one of:
a display mode that displays an image with higher one of two resolutions that have a gap between them if the intensity of the radio waves measured by the reception intensity measurement unit is greater than or equal to a predetermined resolution determination threshold, and
a display mode that displays an image with lower one of the two resolutions if the intensity is less than the resolution determination threshold.

3. A display device comprising:
a telephone communication signal reception antenna that receives radio waves utilized in telephone communication;
a reception intensity measurement unit that measures an intensity of the radio waves received by the communication signal reception antenna;
a display control unit that controls the display unit based on the display mode determined by the determination unit; and
a determination unit that determines, based on the intensity of the radio waves measured by the reception intensity measurement unit, a display mode that displays an image at a display unit by using a representation method which is predetermined associated with the intensity of the radio waves, wherein the determination unit determines the display mode to be one of:
a display mode that displays an image with higher one of two frame rates that have a gap between them if the intensity of the radio waves measured by the reception intensity measurement unit is greater than or equal to a predetermined frame rate determination threshold, and
a display mode that displays an image with lower one of the two frame rates if the intensity is less than the frame rate determination threshold.

4. A display control method comprising:
a step that receives radio waves utilized in telephone communication;
a step that measures an intensity of the received radio waves;

a step that determines, based on the intensity of the measured radio waves, a display mode that displays an image at a display unit by using a representation method which is predetermined associated with the intensity of the radio waves; and a step that controls the display unit based on the determined display mode, wherein the display unit comprises:
- a two-dimensional display part that displays a two-dimensional image; and
- a three-dimensional display part that displays a three-dimensional image; and wherein the determining step determines the display mode to be one of:
- a display mode that displays a three-dimensional image by utilizing the three-dimensional display part if the intensity of the radio waves measured by the reception intensity measurement unit is greater than or equal to a predetermined display dimension determination threshold, and
- a display mode that displays a two-dimensional image by utilizing the two-dimensional display part if the intensity is less than the display dimension determination threshold.

5. A non-transitory computer readable medium storing a program utilized to make a computer function as:

a device that receives radio waves utilized in telephone communication;

a device that measures an intensity of the received radio waves;

a device that determines, based on the intensity of the measured radio waves, a display mode that displays an image at a display unit by using a representation method which is predetermined associated with the intensity of the radio waves; and a device that controls the display unit based on the determined display mode, wherein the display unit comprises:
- a two-dimensional display part that displays a two-dimensional image; and
- a three-dimensional display part that displays a three-dimensional image; and wherein the determination device determines the display mode to be one of:
- a display mode that displays a three-dimensional image by utilizing the three-dimensional display part if the intensity of the radio waves measured by the reception intensity measurement unit is greater than or equal to a predetermined display dimension determination threshold, and
- a display mode that displays a two-dimensional image by utilizing the two-dimensional display part if the intensity is less than the display dimension determination threshold.

* * * * *